Aug. 23, 1966   M. WOOD   3,268,245
PIPE COUPLING
Filed July 23, 1964
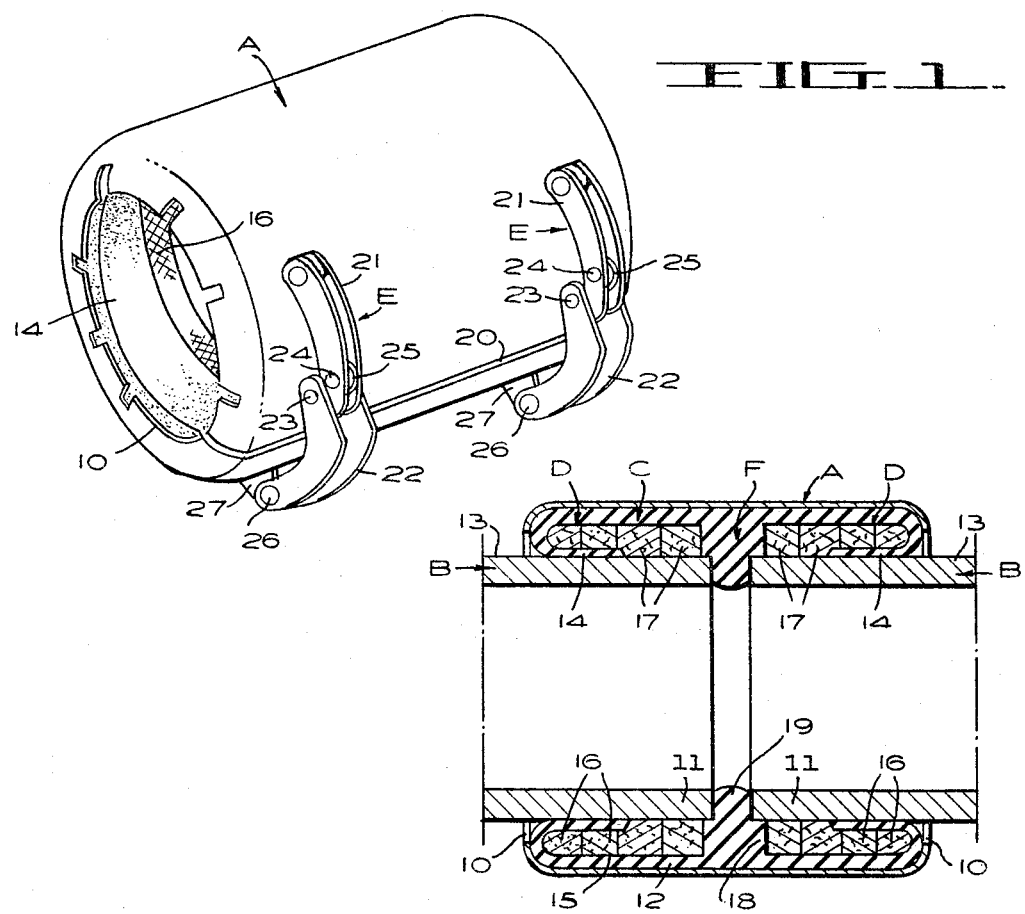
*FIG. 1.*
*FIG. 2.*
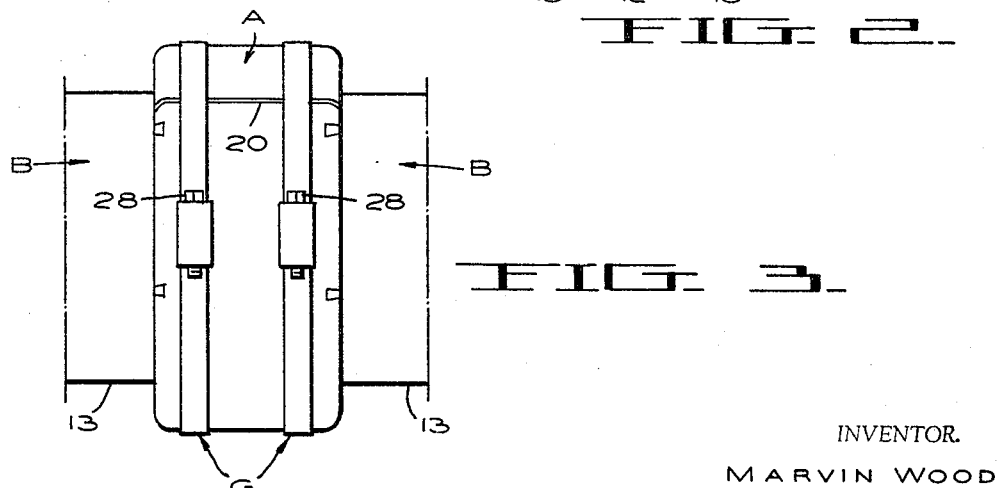
*FIG. 3.*
INVENTOR.
MARVIN WOOD
BY Joseph F. Cole
ATTORNEY

United States Patent Office 3,268,245
Patented August 23, 1966

3,268,245
PIPE COUPLING
Marvin Wood, Tiburon, Calif.
(79 Post St., San Francisco, Calif.)
Filed July 23, 1964, Ser. No. 384,720
3 Claims. (Cl. 285—236)

The present invention relates to improvements in a pipe coupling. It consists of the combinations, constructions and arrangement of parts, as hereinafter described and claimed.

An object of this invention is to provide a pipe coupling that is designed to exercise a double seal action on pipe sections, such as hubless high silicon iron, cast iron and extra heavy cast iron soil pipe and fittings. It permits normal expansion, contraction and deflection of drainage, waste and sewer lines. The seal is obtained by compression of a sleeve gasket contained in an outer shell, and by expansion of packing gasket rings, thus assuring tolerances, stability and leak-proof joints.

A further object of the invention is to provide a pipe coupling of the character described which is simple in construction, durable and efficient for the purpose intended.

Other objects and advantages will appear as the specification continues. The novel features of the invention will be particularly pointed out in the appended claims.

Drawing

For a better understanding of the invention, reference should be had to the accompanying drawing, forming part of this specification, in which:

FIGURE 1 is a perspective view of one embodiment of my pipe coupling;

FIGURE 2 is a longitudinal section view taken through the pipe coupling shown in FIGURE 1; and FIGURE 3 is a side elevational view of a second embodiment of my pipe coupling.

While I have disclosed only the preferred embodiments of my invention, it should be understood that various changes, or modifications, may be made within the scope of the appended claims without departing from the spirit thereof.

Detailed description

Referring now to the drawing in detail, a cylindrical outer shell A has its opposite ends provided with openings into which pipe sections B may be inserted. These openings are designated at 10. A sleeve gasket C is disposed within shell A and has sufficient length to bridge across adjacent ends 11 of the pipe sections B, as clearly shown in FIGURE 2 of the drawing.

The outer shell A may be fashioned from any suitable material, such as stainless steel or steel, for instance, and can have a plain cylindrical shape as shown in FIGURE 1, or it may be corrugated or reinforced by ribs (not shown). Likewise, the sleeve gasket C may be made from any desired resilient material, such as neoprene compound or rubber, and it is disposed within the shell A so as to be compressed when the latter is contracted in the manner hereinafter set forth.

As to its structural details, the sleeve gasket C defines a cylindrical base 12 contacting with the interior surface of the outer shell, this base being spaced outwardly from the exterior surfaces 13 of the pipe sections B. Moreover, this sleeve gasket is formed with a pair of annular flaps 14, one being connected to each of the opposite ends of the base 12, as disclosed in FIGURE 2. These flaps project toward one another and are located to surround and bear against the exterior surfaces 13 of the pipe sections B. The sleeve gasket is designed to absorb shocks and vibration.

It will be noted that the annular flaps 14 are spaced inwardly from the interior surface 15 of the cylindrical base 12 to form circumferential recesses D encircling the pipe sections B. Gasket rings 16 are mounted in the recesses D, and are made from a material that will expand when subjected to water reaching them from between adjacent ends of the pipe sections, thereby forcing the annular flaps 14 into fluid-tight relation with the exterior surfaces of the pipe sections.

The gasket rings may be "Sealite" material in which long fiber oakum jute core is covered with a braided fiberglass jacket. Each oakum strand is coated with a sealing compound and compressed by passing through a sizing die prior to the application of the jacket.

It will be apparent from FIGURE 2 of the drawing that additional gasket rings 17 of the same material are mounted in the sleeve gasket C so as to be interposed between and bear against both the cylindrical base 12 and the adjacent end sections 11 of the pipes B.

Moreover, a stepped internal annular flange F is fashioned on the interior of the cylindrical base 12 of the sleeve gasket C. This flange has an outer ring portion 18 located to bridge across adjacent ends of the pipe sections B, and further has an annular tongue 19 positioned to serve as a stop to limit inward insertion of the pipe sections into the sleeve gasket.

The gasket rings 16–17 on each side of the annular flange F may be sewn together into one single unit, if desired.

In order to exercise a mechanical seal on the surfaces 13 of the hubless pipe sections B, the shell is formed with a lengthwise split 20 so that the shell may be expanded and contracted. Any suitable means, such as clamps E in FIGURE 1, or tension bands G in FIGURE 3, may be employed for contracting the outer shell A and thereby compress the sleeve gasket C and the gasket rings 16–17 against the pipe sections B.

As shown in FIGURE 1, each clamp E has a pair of toggle links 21–22, the adjacent ends of which are swingably secured together by pivot pins 23. The link 21 may be swingably attached by a pin 24 and lug 25 to the outer shell A near one side of the split 20, while the link 22 may be swingably attached by a pin 26 and lug 27 to the outer shell near the other side of this split. When the link 21 is thrown into the position shown in FIGURE 1, the toggle links will be locked.

The sleeve gasket C may be internally coated, taped or painted with "Teflon" (fluorinated polymer) for usage in chemical waste lines.

In FIGURE 3, the tension bands G encircle the outer shell A, and these bands may be tightened by turning screws 28. Of course, the outer shell in FIGURE 3 contains a sleeve gasket C and gasket rings 16–17 in the same manner as shown in FIGURE 2 of the drawing.

I claim:
1. A pipe coupling comprising:
   (a) a cylindrical outer shell having opposite ends provided with openings into which pipe sections may be inserted;
   (b) a sleeve gasket disposed within the shell and having sufficient length to bridge across adjacent ends of the pipe sections;
   (c) this gasket defining a cylindrical base contacting with an interior surface of the shell, this base being spaced from the exterior surfaces of the pipe sections;
   (d) the gasket further being formed with a pair of annular flaps, one being connected to each of the opposite ends of the base, these flaps projecting toward one another and being located to surround and bear against the exterior surfaces of the pipe sections;

(e) the flaps being spaced inwardly from the interior surface of the base to form circumferential recesses encircling the pipe sections;
(f) gasket rings mounted in the recesses to surround and bear directly against the annular flaps, and being made from a material that will expand when subjected to water reaching them from between adjacent ends of the pipe sections, thereby forcing the annular flaps into fluid-tight relation with the exterior surfaces of the pipe sections;
(g) and means operable to contract the shell against the sleeve gasket to compress the latter and the gasket rings against the pipe sections.

2. A pipe coupling comprising:
(a) a cylindrical outer shell having opposite ends provided with openings into which pipe sections may be inserted;
(b) a sleeve gasket disposed within the shell and having sufficient length to bridge across adjacent ends of the pipe sections;
(c) this gasket defining a cylindrical base contacting with an interior surface of the shell, this base being spaced from the exterior surfaces of the pipe sections;
(d) the gasket further being formed with a pair of annular flaps, one being connected to each of the opposite ends of the base, these flaps projecting toward one another and being located to surround and bear against the exterior surfaces of the pipe sections;
(e) the flaps being spaced inwardly from the interior surface of the base to form circumferential recesses encircling the pipe sections;
(f) gasket rings mounted in the recesses, and being made from a material that will expand when subjected to water reaching them from between adjacent ends of the pipe sections, thereby forcing the annular flaps into fluid-tight relation with the exterior surfaces of the pipe sections;
(g) means operable to contract the shell against the sleeve gasket to compress the latter and the gasket rings against the pipe sections;
(h) additional gasket rings of the same material as the first-mentioned gasket rings mounted within the sleeve gasket so as to be interposed between and bear against both the cylindrical base and the adjacent end sections of the pipes;
(i) a stepped internal annular flange fashioned on the interior of the cylindrical base of the sleeve gasket and having an annular tongue positioned to serve as a stop to limit inward insertion of the pipe sections into the sleeve gasket;
(j) the first-mentioned gasket rings and said additional gasket rings completely filling chambers formed by the base, flaps and flange of the sleeve gasket and the outer surfaces of the pipe sections.

3. The pipe coupling as set forth in claim 2;
(k) and in which all of the gasket rings are made from long fiber oakum jute core that is covered with a braided fiberglass jacket, each oakum strand being coated with a sealing compound and compressed.

References Cited by the Examiner

UNITED STATES PATENTS

| | | | |
|---|---|---|---|
| 2,479,960 | 8/1949 | Osborn | 285—112 X |
| 3,006,663 | 10/1961 | Bowne | 285—373 X |
| 3,154,329 | 10/1964 | Skinner | 285—239 |
| 3,178,206 | 4/1965 | Martin et al. | 285—236 X |

FOREIGN PATENTS

| | | |
|---|---|---|
| 628,321 | 10/1961 | Canada. |
| 678,400 | 1/1964 | Canada. |
| 626,968 | 7/1949 | Great Britain. |

References Cited by the Applicant

UNITED STATES PATENTS

| | | |
|---|---|---|
| 2,225,208 | 12/1940 | Crickmer. |
| 2,259,940 | 10/1941 | Nathan. |
| 2,459,251 | 1/1949 | Stillwagon. |
| 2,786,697 | 3/1957 | Rescheneder. |
| 3,003,793 | 10/1961 | Pitt. |
| 3,127,196 | 3/1964 | Fabian. |

CARL W. TOMLIN, *Primary Examiner.*
THOMAS F. CALLAGHAN, *Examiner.*